US012607716B2

(12) United States Patent
Jo et al.

(10) Patent No.: US 12,607,716 B2
(45) Date of Patent: Apr. 21, 2026

(54) NOISE ADDITION ELECTRONIC WARFARE APPARATUS AND METHOD FOR DECEPTION FREQUENCY BASED ON FREQUENCY DOMAIN

(71) Applicant: AGENCY FOR DEFENSE DEVELOPMENT, Daejeon (KR)

(72) Inventors: Jeil Jo, Daejeon (KR); Seungho Choi, Daejeon (KR); Junghoon Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 278 days.

(21) Appl. No.: 18/619,399

(22) Filed: Mar. 28, 2024

(65) Prior Publication Data

US 2025/0199118 A1 Jun. 19, 2025

(30) Foreign Application Priority Data

Apr. 6, 2023 (KR) ........................ 10-2023-0045521

(51) Int. Cl.
*G01S 7/38* (2006.01)

(52) U.S. Cl.
CPC ...................................... *G01S 7/38* (2013.01)

(58) Field of Classification Search
CPC .......... G01S 7/4069; G01S 7/36; G01S 7/023; G01S 7/38; H04K 2203/30; H04K 2203/10; H04K 2203/20; H04K 2203/22; H04K 2203/24; H04K 3/40; H04K 3/42; H04K 3/65; H04K 3/825; H04K 3/827; H04K 3/43; H04K 3/44; H04K 3/45; H04K 3/60
See application file for complete search history.

(56) References Cited

U.S. PATENT DOCUMENTS 3,604,828 A * 9/1971 Perkovich ............. G01S 7/4052
342/13
4,644,357 A * 2/1987 Schaaf .................. G01S 7/4052
434/2
6,150,976 A * 11/2000 Cooley ................. G01S 7/4052
342/170

(Continued)

FOREIGN PATENT DOCUMENTS

KR 10-1534662 B1 7/2015
KR 10-1967886 B1 4/2019

(Continued)

*Primary Examiner* — Michael W Justice
(74) *Attorney, Agent, or Firm* — Dilworth & Barrese, LLP.; Michael J. Musella, Esq.

(57) ABSTRACT

An electronic warfare apparatus includes a Doppler generator configured to change an input frequency of a transmission signal of a radar and output a deception signal having a deception frequency, a distributor configured to distribute the deception signal to a first path and a second path, a noise processing unit located in the first path and configured to mix noise with the deception signal and then control a signal intensity of the noise, a deception signal processing unit located in the second path and configured to control a signal intensity of the deception signal, and a combiner configured to combine a noise signal output from the noise processing unit and the deception signal output from the deception signal processing unit and output a noise mixture deception signal.

18 Claims, 12 Drawing Sheets

(56)                    References Cited

U.S. PATENT DOCUMENTS

| | | | | |
|---|---|---|---|---|
| 6,295,020 | B1 * | 9/2001 | Koechlin | H03B 21/02 |
| | | | | 342/16 |
| 6,384,772 | B1 * | 5/2002 | Bradley | G01S 7/4052 |
| | | | | 342/170 |
| 7,649,988 | B2 * | 1/2010 | Suppappola | G10L 19/012 |
| | | | | 379/406.03 |
| 7,782,250 | B2 * | 8/2010 | Shih | G01S 7/4052 |
| | | | | 342/170 |
| 8,248,297 | B1 * | 8/2012 | Baker | G01S 7/4052 |
| | | | | 342/174 |
| 10,069,669 | B2 * | 9/2018 | Darwish | H04B 1/0483 |
| 10,574,383 | B1 * | 2/2020 | Lee | H04K 3/224 |
| 10,999,001 | B2 | 5/2021 | Chen et al. | |
| 11,656,331 | B2 * | 5/2023 | Bourde | G01S 13/34 |
| | | | | 342/169 |
| 2004/0012517 | A1 * | 1/2004 | Abou-Jaoude | G01S 7/4052 |
| | | | | 342/171 |
| 2022/0171022 | A1 * | 6/2022 | Bourde | G01S 7/4095 |

FOREIGN PATENT DOCUMENTS

| | | | |
|---|---|---|---|
| KR | 10-2095391 | B1 | 3/2020 |
| KR | 10-2022-0122021 | A | 9/2022 |
| KR | 10-2022-0136826 | A | 10/2022 |

* cited by examiner

NOISE ADDITION ELECTRONIC WARFARE APPARATUS AND METHOD FOR DECEPTION FREQUENCY BASED ON FREQUENCY DOMAIN

CROSS-REFERENCE TO RELATED APPLICATION

This application claims priority to and the benefit of Korean Patent Application No. 10-2023-0045521 filed in the Korean Intellectual Property Office on Apr. 6, 2023, the entire contents of which are incorporated herein by reference.

BACKGROUND

(a) Field

Embodiments of the present invention relates to a noise addition electronic warfare apparatus and method for a deception frequency based on a frequency domain.

(b) Description of the Related Art

An anti-aircraft radar system obtains a Doppler of a moving object (target) and estimates a speed of the moving object. A continuous wave (CW) may be used as one of signals used to obtain the Doppler. The CW includes an unmodulated CW signal and a modulated frequency modulation continuous waves (FMCW).

In general, a radar using the FMCW changes and transmits a frequency at a constant rate over time and then obtains a Doppler frequency of a reflection signal reflected from the target. An electronic warfare apparatus corresponding to the radar using the FMCW generates a deception frequency by using a CW repeater. A transmission signal of the radar reflected by the target and received by the radar is a reflection signal (echo signal), and the reflection signal includes information of a Doppler frequency of the target. When the CW repeater of the electronic warfare apparatus transmits the deception frequency, the radar simultaneously receives the reflection signal and the deception frequency.

When the radar simultaneously receives the reflection signal and the deception frequency, the radar may operate an algorithm that tracks only the reflection signal by operating a circuit that determines the deception frequency. If the radar algorithm tracks the reflection signal instead of the deception frequency, there is a disadvantage in that an electronic warfare against radar is neutralized.

SUMMARY

Embodiments of the present invention attempts to provide a noise addition electronic warfare apparatus and method for a deception frequency based on a frequency domain capable of generating a deception signal mixed with noise that masks a reflection signal for a radar that obtains speed information of a target by using a Doppler frequency.

An electronic warfare apparatus according to an embodiment of the present invention includes a Doppler generator configured to change an input frequency of a transmission signal of a radar and output a deception signal having a deception frequency, a distributor configured to distribute the deception signal to a first path and a second path, a noise processing unit located in the first path and configured to mix noise with the deception signal and then control a signal intensity of the noise, a deception signal processing unit located in the second path and configured to control a signal intensity of the deception signal, and a combiner configured to combine a noise signal output from the noise processing unit and the deception signal output from the deception signal processing unit and output a noise mixture deception signal.

The noise processing unit may control the signal intensity of the noise to a signal intensity at which the noise signal may mask a reflection signal obtained by reflecting the transmission signal from a target.

The noise processing unit includes a noise generator configured to generate noise, a mixer configured to mix the noise with the deception signal and output a first noise addition signal, a first amplifier configured to amplify the first noise addition signal and output a first amplification signal, and a first variable attenuator configured to attenuate a signal intensity of the first amplification signal and output a first attenuation signal.

The first amplifier may amplify the first noise addition signal to the maximum and output the first amplification signal of a constant maximum signal intensity.

The first variable attenuator may attenuate the signal intensity of the first amplification signal to a signal intensity greater than a signal intensity of a reflection signal received from the radar and less than a signal intensity of the deception signal and output the first attenuation signal.

The deception signal processing unit may include a second amplifier configured to amplify the deception signal and output a second amplification signal, and a second variable attenuator configured to attenuate a signal intensity of the second amplification signal and output a second attenuation signal.

The second amplifier may amplify the deception signal to the maximum and output the second amplification signal of a constant maximum signal intensity.

The second variable attenuator may attenuate a signal intensity of the second attenuation signal to a signal intensity greater than a signal intensity of the first attenuation signal and output the second attenuation signal.

The combiner may combine the first attenuation signal and the second attenuation signal and output the noise mixture deception signal.

An electronic warfare apparatus according to another embodiment of the present invention includes a noise processing unit configured to mix noise with a deception signal having a deception frequency and then control a signal intensity of the noise to a signal intensity capable of masking a reflection signal received from a radar, and output a noise signal, a deception signal processing unit configured to control a signal intensity of the deception signal to a signal intensity greater than a signal intensity of the noise signal, and a combiner configured to combine the noise signal and the deception signal output from the deception signal processing unit and output a noise mixture deception signal.

The electronic warfare apparatus may further include a Doppler generator configured to change an input frequency of a transmission signal of the radar and output a deception signal having the deception frequency, and a distributor configured to distribute the deception signal having the deception frequency to the noise processing unit and the deception signal processing unit.

A noise addition method for a deception frequency according to another embodiment of the present invention includes changing an input frequency of a transmission signal of a radar and outputting a deception signal having a deception frequency, distributing the deception signal to a first path and a second path, mixing noise with the deception signal in the first path and then controlling a signal intensity of the noise, and outputting a noise signal, controlling a signal intensity of the deception signal in the second path and outputting the deception signal, and combining a noise signal output in the first path and the deception signal output in the second path and outputting a noise mixture deception signal.

The signal intensity of the noise may be controlled so that the noise signal may mask a reflection signal obtained by reflecting the transmission signal from a target.

The outputting of the noise signal may include mixing the noise with the deception signal and outputting a first noise addition signal, amplifying the first noise addition signal to the maximum and outputting the first amplification signal of a constant maximum signal intensity, and attenuating the signal intensity of the first amplification signal to a signal intensity greater than a signal intensity of a reflection signal received from the radar and less than a signal intensity of the deception signal and outputting the first attenuation signal.

The controlling of the signal intensity of the deception signal in the second path and outputting of the deception signal may include amplifying the deception signal to the maximum and outputting the second amplification signal of a constant maximum signal intensity, and attenuating a signal intensity of the second attenuation signal to a signal intensity greater than a signal intensity of the first attenuation signal and outputting the second attenuation signal.

The noise mixture deception signal may be output by combining the first attenuation signal and the second attenuation signal.

A noise addition method for a deception frequency according to another embodiment of the present invention includes mixing noise with a first deception signal having the deception frequency and then control a signal intensity of the noise to a signal intensity capable of masking a reflection signal received from a radar, and outputting a noise signal, controlling a signal intensity of the first deception signal to a signal intensity greater than a signal intensity of the noise signal and outputting a second deception signal, and combining the noise signal and the second deception signal and outputting a noise mixture deception signal.

The outputting of the noise signal may include mixing noise with the first deception signal and outputting a first noise addition signal, amplifying the first noise addition signal to the maximum and outputting the first amplification signal of a constant maximum signal intensity, and attenuating the signal intensity of the first amplification signal to a signal intensity greater than a signal intensity of the reflection signal and less than a signal intensity of the first deception signal and outputting the noise signal.

The noise addition electronic warfare apparatus and method for the deception frequency based on the frequency domain according to an embodiment of the present invention may generate the deception signal mixed with noise that masks the reflection signal for the radar that obtains the speed information of the target by using the Doppler frequency so that the radar does not receive the reflection signal but receives only the deception signal having the deception frequency.

DETAILED DESCRIPTION

Figure 1:
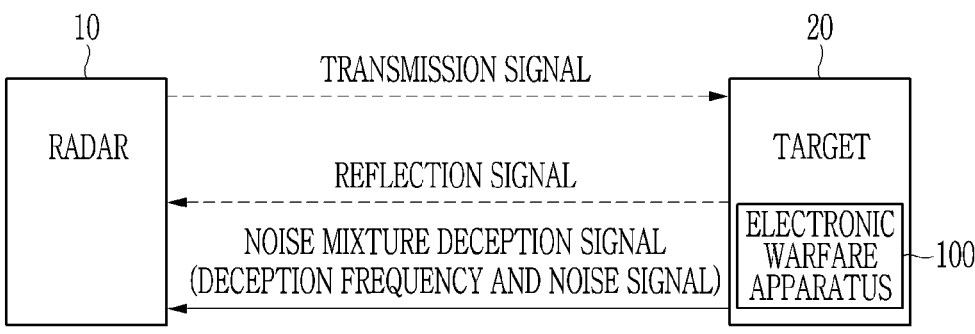
FIG. 1 is a block diagram showing a radar and an electronic warfare apparatus according to an embodiment of the present invention.

With reference to the attached drawings, embodiments of the present invention will be described in detail below so that ordinary skilled in the art may easily implement the present invention. The present invention may be implemented in many different forms and is not limited to the embodiments described herein.

In order to clearly explain the present invention, parts irrelevant to the description are omitted, and same reference numerals designate same or like elements throughout the specification.

In addition, throughout the specification, unless explicitly described to the contrary, the word "comprise", and variations such as "comprises" or "comprising", may be understood to imply the inclusion of stated elements but not the exclusion of any other elements.

FIG. 1 is a block diagram showing a radar and an electronic warfare apparatus according to an embodiment of the present invention.

Referring to FIG. 1, a radar 10 may detect and track a target 20 by emitting a transmission signal, receiving a reflection signal that is reflected from the target 20 and returned, and obtaining a Doppler frequency of the reflection signal. The transmission signal may be a continuous wave (CW).

The target 20 includes an electronic warfare apparatus 100. When the transmission signal of the radar 10 is received, the electronic warfare apparatus 100 may generate and emit a noise mixture deception signal that masks the reflection signal. The noise mixture deception signal may be generated by mixing a deception frequency and a noise signal. The noise mixture deception signal may cause the radar 10 not to receive the reflection signal but to receive only a deception signal having the deception frequency.

Hereinafter, with reference to FIGS. 2 to 12, a noise addition electronic warfare apparatus and method for a deception frequency based on a frequency domain according to an embodiment of the present invention will be described in more detail.

Figure 2:
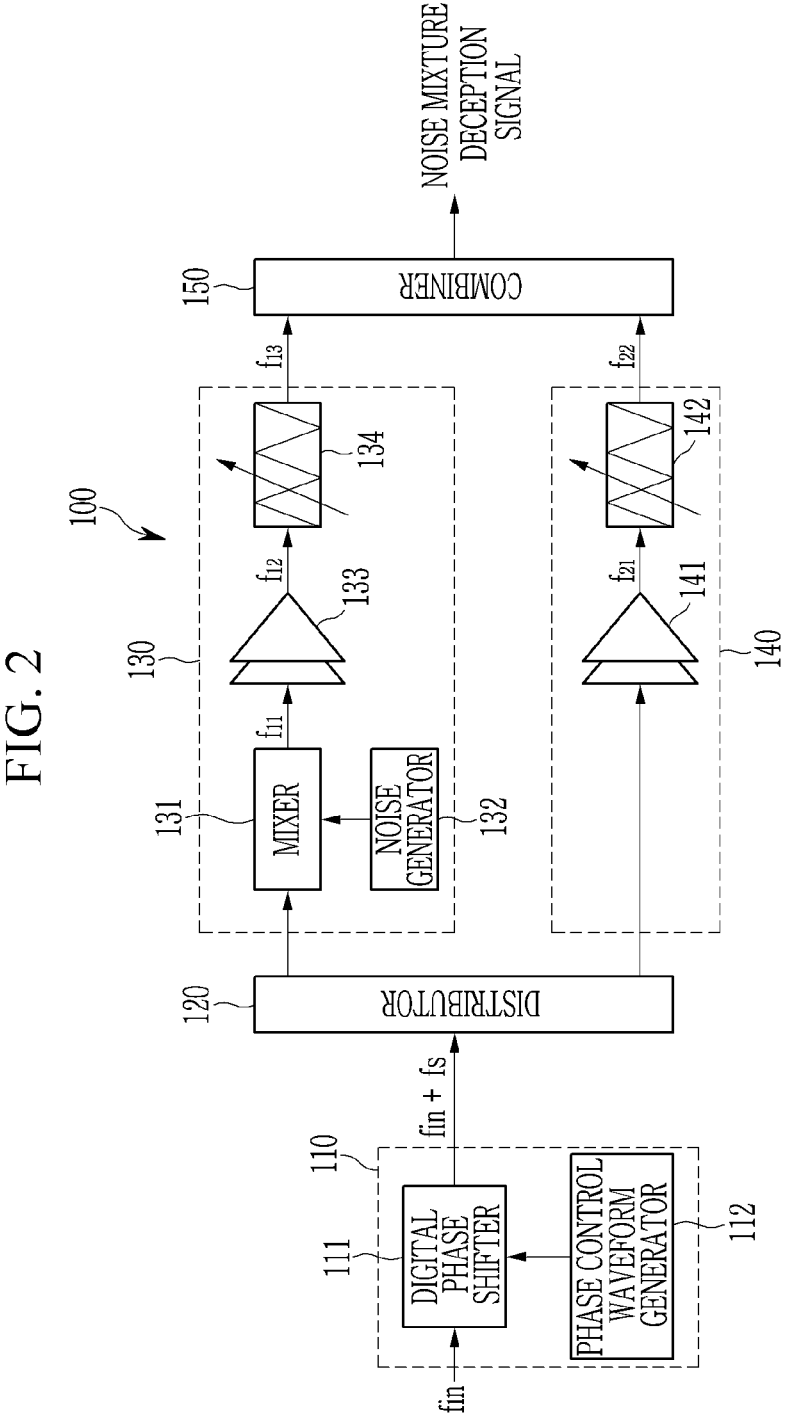
FIG. 2 is a block diagram showing a noise addition electronic warfare apparatus for a deception frequency based on a frequency domain according to an embodiment of the present invention.

FIG. 2 is a block diagram showing a noise addition electronic warfare apparatus for a deception frequency based on a frequency domain according to an embodiment of the present invention.

Referring to FIG. 2, the electronic warfare apparatus 100 may include a Doppler generator 110, a distributor 120, a noise processing unit 130, a deception signal processing unit 140, and a combiner 150.

A transmission signal from the radar 10 is input to the Doppler generator 110. An input frequency fin of the transmission signal corresponds to a frequency of a reflection signal. As an example, a frequency spectrum of the reflection signal in FIG. 3 is illustrated.

Figure 3:
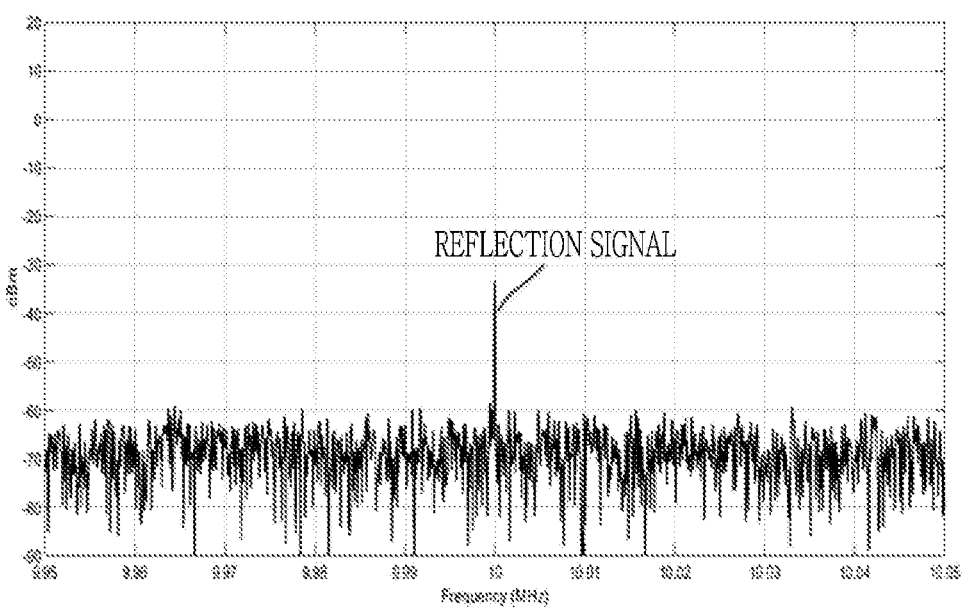
FIG. 3 shows a frequency spectrum of a reflection signal according to an embodiment.

FIG. 3 shows a frequency spectrum of a reflection signal according to an embodiment.

Referring to FIG. 3, the frequency spectrum of the reflection signal received by the radar 10 is shown. Hereinafter, an example in which the magnitude of the reflection signal received by the radar 10 is approximately −30 dBm and a frequency of the reflection signal is 10 MHz is explained. At this time, the input frequency fin of a transmission signal received by the Doppler generator 110 of the electronic warfare apparatus 100 is also 10 MHz.

Referring again to FIG. 2, when the transmission signal of the radar 10 is input, the Doppler generator 110 may perform a process of changing the input frequency fin of the transmission signal and outputting a deception frequency fin+fs. That is, a deception signal having the deception frequency fin+fs output from the Doppler generator 110 may be output. To this end, the Doppler generator 110 may include a digital phase shifter 111 and a phase control waveform generator 112.

Figure 4:
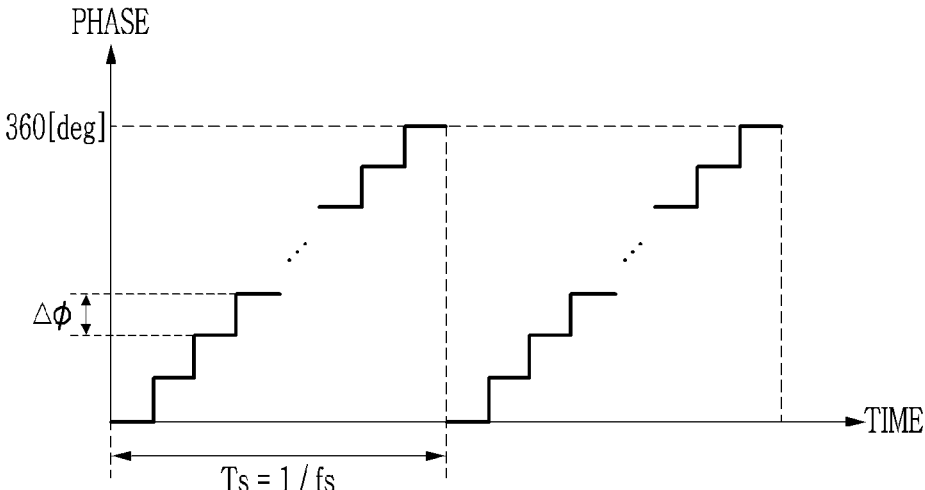
FIG. 4 shows a method of performing phase control in a phase control waveform generator for phase control of a digital phase shifter.

The phase control waveform generator 112 may perform phase control as illustrated in FIG. 4 to generate a phase control frequency fs and provide the phase control frequency fs to the digital phase shifter 111.

FIG. 4 shows a method of performing phase control in a phase control waveform generator for phase control of a digital phase shifter.

Referring to FIG. 4, the phase control waveform generator 112 may perform a phase change at a phase control interval @@@ from a phase of 0 [deg] to 360 [deg] on the input frequency fin for a time Ts corresponding to a reciprocal of the phase control frequency fs to generate the phase control frequency fs.

Referring again to FIG. 2, the digital phase shifter 111 may add the phase control frequency fs to the input frequency fin of the transmission signal to generate the deception frequency fin+fs, and input the deception frequency having the deception frequency fin+fs to the distributor 120.

Figure 5:
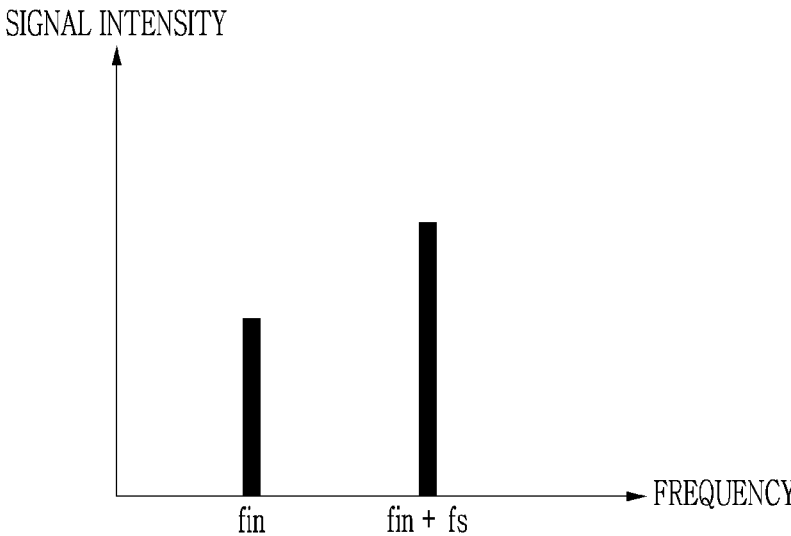
FIG. 5 shows an input frequency and a deception frequency according to an embodiment.

FIG. 5 shows an input frequency and a deception frequency according to an embodiment.

Referring to FIG. 5, the deception frequency fin+fs is a frequency moved by the phase control frequency fs with respect to the input frequency fin. The deception frequency fin+fs may be a frequency greater or less than the input frequency fin by the phase control frequency fs. Hereinafter, an example in which the deception frequency fin+fs is greater than the input frequency fin by the phase control frequency fs is explained.

If the deception frequency having the deception frequency fin+fs is emitted to the radar 10 as it is, the radar 10 simultaneously receives the reflection signal and the deception signal. At this time, the radar 10 may operate an algorithm responsive to the deception frequency fin+fs to remove the deception frequency having the deception frequency fin+fs and receive the reflection signal.

In response, the electronic warfare apparatus 100 according to an embodiment of the present invention generates and emits a noise mixture deception signal that masks the reflection signal so that the radar 10 does not receive the reflection signal and receives only the deception frequency having the deception frequency fin+fs.

Figure 6:
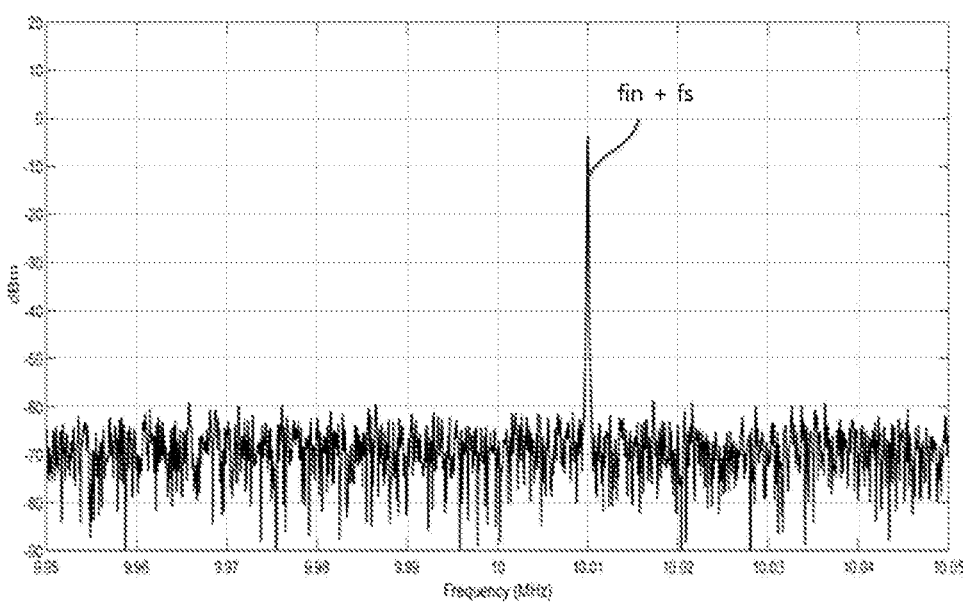
FIG. 6 shows a frequency spectrum of a deception frequency according to an embodiment.

FIG. 6 shows a frequency spectrum of a deception frequency according to an embodiment.

Referring to FIG. 6, the magnitude of the deception frequency having the deception frequency fin+fs output from the Doppler generator 110 is approximately 0 dbm, and a frequency of the deception signal is 10.01 MHz. That is, the phase control frequency fs is shifted from the input frequency fin of 10 MHz in FIG. 3 by 10 KHz, and the deception frequency of 10.01 MHz is output.

Referring again to FIG. 2, the distributor 120 may perform a process of distributing the deception signal having the deception frequency fin+fs input from the Doppler generator 110 to a first path and a second path. The first path is a path that mixes noise with the deception signal, and the second path is a path that controls a signal intensity of the deception signal.

The noise processing unit 130 may be located in the first path to mix noise with the deception signal of the first path and control a signal intensity of the noise. The noise processing unit 130 may control the signal intensity of the noise to a signal intensity at which an output noise signal may mask the reflection signal. To this end, the noise processing unit 130 may include a mixer 131, a noise generator 132, a first amplifier 133, and a first variable attenuator 134.

The noise generator 132 may generate noise and provide the noise to the mixer 131, and the mixer 131 may perform a process of mixing the noise with the deception signal having the deception frequency fin+fs and outputting a first noise addition signal $f_{11}$. The mixer 131 may mix the noise with the deception frequency fin+fs by using a double sideband mixer. A signal intensity of the first noise addition signal $f_{11}$ in which the noise is mixed with the deception frequency fin+fs may be attenuated due to a conversion loss of the mixer 131.

Figure 7:
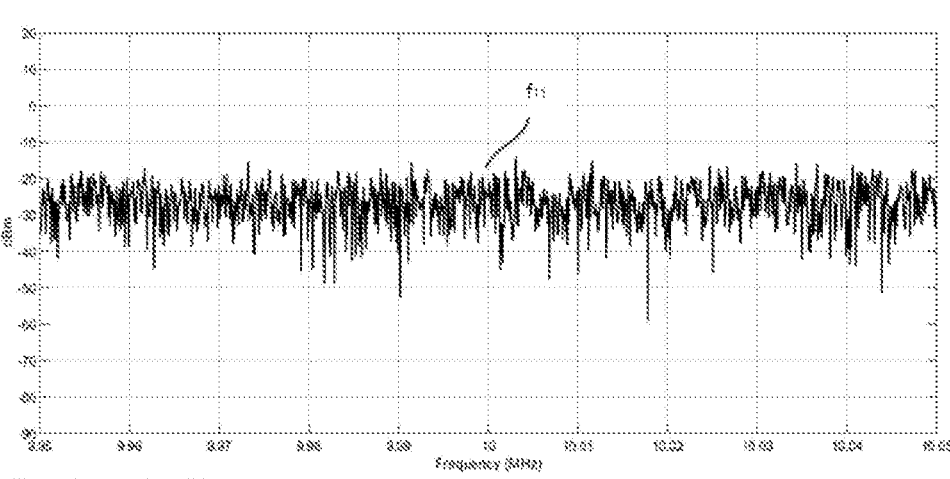
FIG. 7 shows a frequency spectrum of a first noise addition signal according to an embodiment of the present invention.

FIG. 7 shows a frequency spectrum of a first noise addition signal according to an embodiment of the present invention.

Referring to FIG. 7, it may be seen that a signal intensity of the first noise addition signal $f_{11}$ in which the noise is mixed with the deception frequency fin+fs is attenuated to approximately −20 dBm due to a conversion loss of the mixer 131.

Referring again to FIG. 2, the first amplifier 133 may perform a process of amplifying the first noise addition signal $f_{11}$ and outputting a first amplification signal $f_{12}$ so as to compensate for the signal intensity of the signal attenuated in the mixer 131. The first amplifier 133 may amplify the first noise addition signal $f_{11}$ to the maximum (saturation) to output the first amplification signal $f_{12}$ with a constant maximum signal intensity. The first amplification signal $f_{12}$ may serve to set a standard for the signal intensity of noise. That is, the first amplifier 133 may output noise at a constant signal intensity even if the signal intensity of input noise changes.

Figure 8:
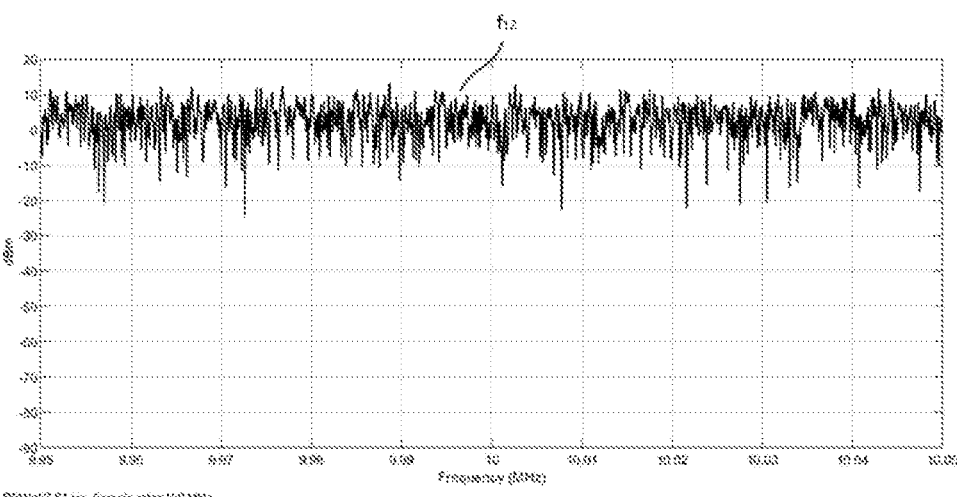
FIG. 8 shows a frequency spectrum of a first amplification signal according to an embodiment of the present invention.

FIG. 8 shows a frequency spectrum of a first amplification signal according to an embodiment of the present invention.

Referring to FIG. 8, it may be seen that a signal intensity of the first amplification signal $f_{12}$ obtained by amplifying the first noise addition signal $f_{11}$ has increased to approximately 10 dBm. 10 dBm of the first amplification signal $f_{12}$ may be a standard for the signal intensity in a first path.

Referring again to FIG. 2, since the signal intensity of the signal to which noise is added needs to be less than the signal intensity of 0 dBm of the deception signal, the first variable attenuator 134 may perform a process of attenuating the signal intensity of the first amplification signal $f_{12}$ and outputting a first attenuation signal $f_{13}$. The signal intensity of the first attenuation signal $f_{13}$ may be greater than the signal intensity of the reflection signal received from the radar 10 and less than the signal intensity of the deception signal. That is, the first variable attenuator 134 may attenuate the signal intensity of the first amplification signal $f_{12}$ to a signal intensity greater than the signal intensity of the reflection signal received from the radar 10 and less than the signal intensity of the deception signal to output the first attenuation signal $f_{13}$.

Figure 9:
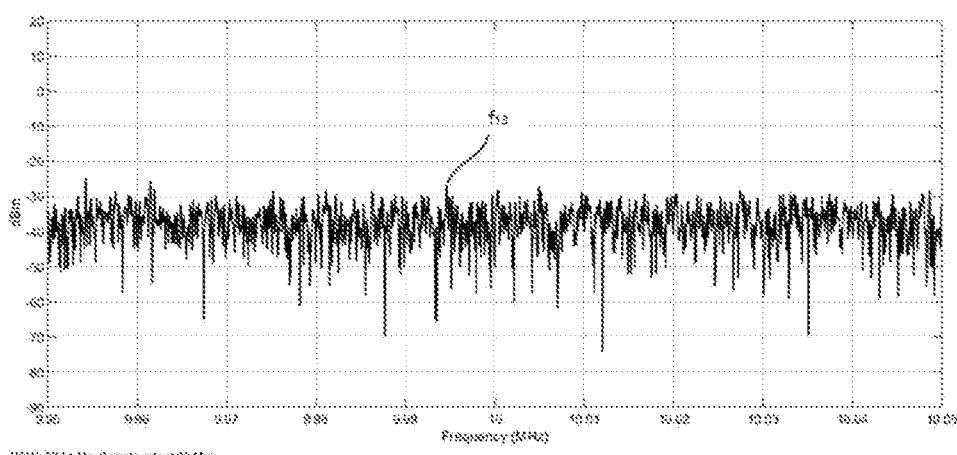
FIG. 9 shows a frequency spectrum of a first attenuation signal according to an embodiment of the present invention.

FIG. 9 shows a frequency spectrum of a first attenuation signal according to an embodiment of the present invention.

Referring to FIG. 9, it may be seen that the signal intensity of the first attenuation signal $f_{13}$ is output greater than the signal intensity of –30 dBm of the reflection signal and less than the signal intensity of 0 dBm of the deception signal.

Referring again to FIG. 2, the deception signal processing unit 140 may be located in the second path, and may include a second amplifier 141 and a second variable attenuator 142.

The second amplifier 141 may perform a process of amplifying the deception signal having the deception frequency fin+fs and outputting a second amplification signal $f_{21}$. The second amplifier 141 may amplify the deception signal to the maximum (saturation) and output the second amplification signal $f_{21}$ of a constant maximum signal intensity. The second amplification signal $f_{21}$ may serve to set a standard for the signal intensity of the deception signal. In other words, the second amplifier 141 may output the deception signal at a constant signal intensity even if the signal intensity of the input deception signal is changed and input.

Figure 10:
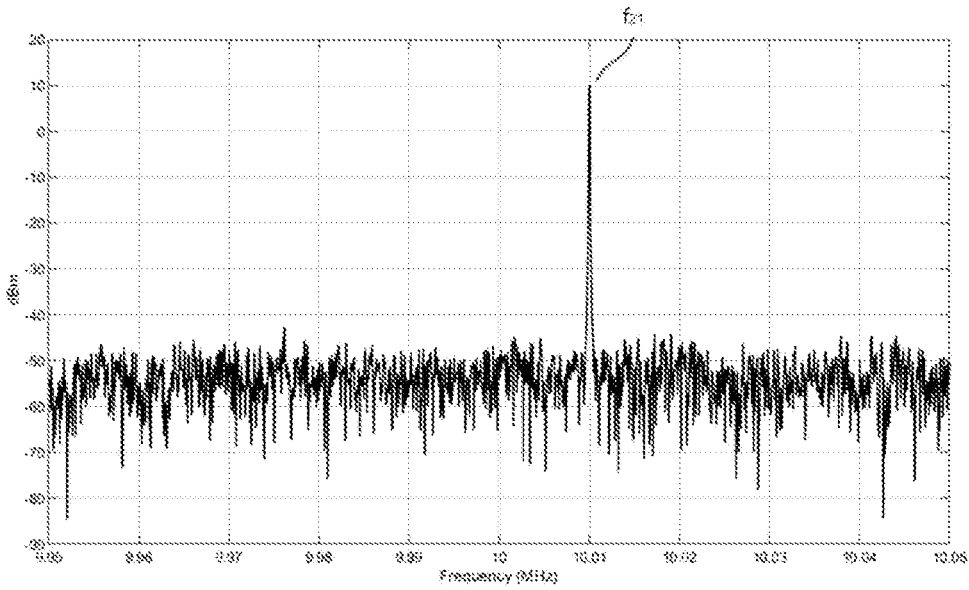
FIG. 10 shows a frequency spectrum of a second amplification signal according to an embodiment of the present invention.

FIG. 10 shows a frequency spectrum of a second amplification signal according to an embodiment of the present invention.

Referring to FIG. 10, it may be seen that the signal intensity of the second amplification signal $f_{21}$ is increased to approximately 10 dBm by amplifying the deception signal. 10 dBm of the second amplification signal $f_{21}$ may be a standard for the signal intensity in the second path.

Referring again to FIG. 2, the second variable attenuator 142 may perform a process of attenuating the signal intensity of the second amplification signal $f_{21}$ and outputting a second attenuation signal $f_{22}$. A signal intensity of the second attenuation signal $f_{22}$ is greater than the signal intensity of the first attenuation signal $f_{13}$ output from the first path. That is, the second variable attenuator 142 may attenuate the signal intensity of the second attenuation signal $f_{22}$ to a signal intensity greater than the signal intensity of the first attenuation signal $f_{13}$ output from the first path to output the second attenuation signal $f_{22}$.

Figure 11:
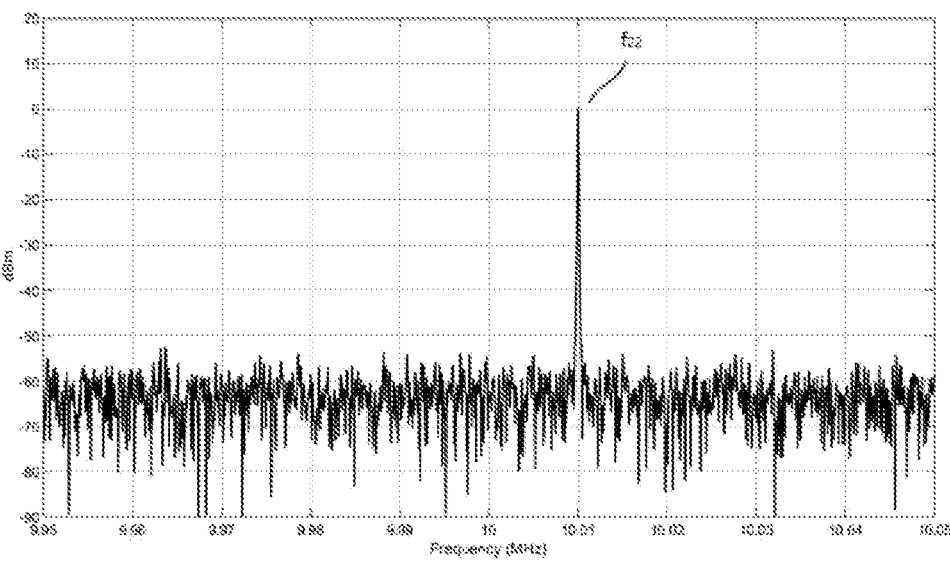
FIG. 11 shows a frequency spectrum of a second attenuation signal according to an embodiment of the present invention.

FIG. 11 shows a frequency spectrum of a second attenuation signal according to an embodiment of the present invention.

Referring to FIG. 11, it may be seen that the signal intensity of the second attenuation signal $f_{22}$ is output at 0 dBm, which is greater than the signal intensity of the first attenuation signal $f_{13}$.

Referring again to FIG. 2, the combiner 150 may combine the noise signal output from the noise processing unit 130 and the deception signal output from the deception signal processor 140 to output a noise mixture deception signal. In other words, the first attenuation signal $f_{13}$ and the second attenuation signal $f_{22}$ may be input to the combiner 150, and the combiner 150 may combine the first attenuation signal $f_{13}$ and the second attenuation signal $f_{22}$ to output the noise mixture deception signal. The noise mixture deception signal is a signal in which a deception signal (the second attenuation signal $f_{22}$) having the deception frequency fin+fs and a noise signal (the first attenuation signal $f_{13}$) are mixed. Since the signal intensity of the first attenuation signal $f_{13}$ is greater than the signal intensity of the reflection signal, the noise mixture deception signal may mask the reflection signal, and accordingly, the radar 10 may not receive the reflection signal but may receive only the deception signal (the second attenuation signal $f_{22}$) having the deception frequency fin+fs.

Figure 12:
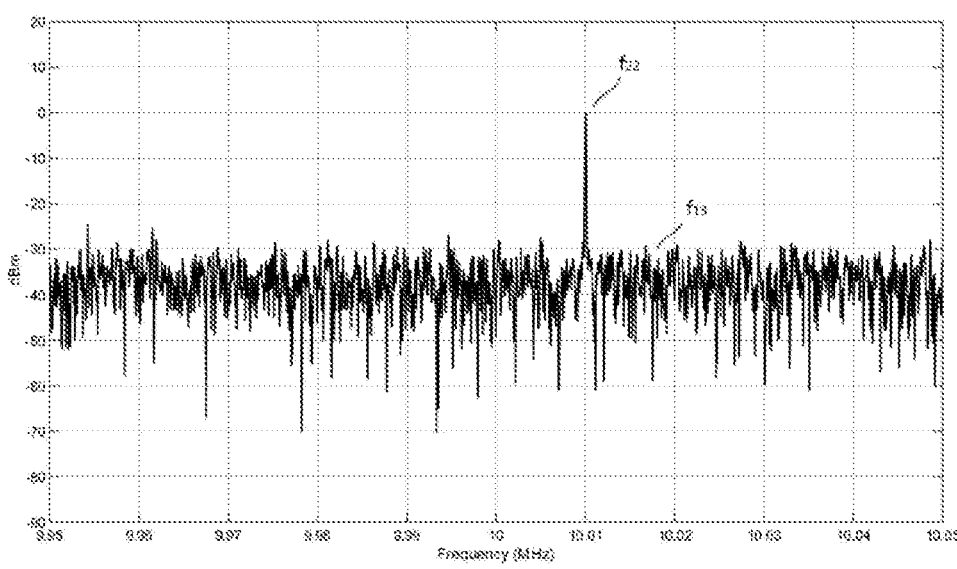
FIG. 12 shows a frequency spectrum of a noise mixture deception signal according to an embodiment of the present invention.

FIG. 12 shows a frequency spectrum of a noise mixture deception signal according to an embodiment of the present invention.

Referring to FIG. 12, it may be seen that the noise mixture deception signal includes the first attenuation signal $f_{13}$ and the second attenuation signal $f_{22}$, a signal intensity of the deception signal (the second attenuation signal $f_{22}$) having the deception frequency fin+fs is approximately 0 dBm, the signal intensity of the noise signal (the first attenuation signal $f_{13}$) is approximately-30 dBm, and thus, the noise mixture deception signal may mask the reflection signal.

The drawings referenced so far and the described detailed description of the invention are merely examples of the present invention, which is used only for the purpose of explaining the present invention and not to limit the meaning or to limit the scope of the present invention described in the claims. Therefore, ordinary skill in the art will understand that various modifications and other equivalent embodiments are possible therefrom. Therefore, the true technical protection scope of the present invention should be determined by the technical spirit of the appended claims.

What is claimed is:

1. An electronic warfare apparatus comprising:
   a Doppler generator configured to change an input frequency of a transmission signal of a radar and output a deception signal having a deception frequency;
   a distributor configured to distribute the deception signal to a first path and a second path;
   a noise processing unit located in the first path and configured to mix noise with the deception signal and then control a signal intensity of the noise;
   a deception signal processing unit located in the second path and configured to control a signal intensity of the deception signal; and
   a combiner configured to combine a noise signal output from the noise processing unit and the deception signal output from the deception signal processing unit and output a noise mixture deception signal,
   the Doppler generator includes
   a phase control waveform generator configured to perform a phase change at a phase control interval from a phase of 0 [deg] to 360 [deg] on the input frequency for a time corresponding to a reciprocal of the phase control frequency and generate the phase control frequency; and
   a digital phase shifter configured to add the phase control frequency to the input frequency and generate the deception frequency.

2. The electronic warfare apparatus of claim 1, wherein:
the noise processing unit is configured to control the
signal intensity of the noise to a signal intensity at
which the noise signal may mask a reflection signal
obtained by reflecting the transmission signal from a
target.

3. The electronic warfare apparatus of claim 1, wherein:
the noise processing unit includes
a noise generator configured to generate noise;
a mixer configured to mix the noise with the deception
signal and output a first noise addition signal;
a first amplifier configured to amplify the first noise
addition signal and output a first amplification signal;
and
a first variable attenuator configured to attenuate a signal
intensity of the first amplification signal and output a
first attenuation signal.

4. The electronic warfare apparatus of claim 3, wherein:
the first amplifier is configured to amplify the first noise
addition signal to the maximum and output the first
amplification signal of a constant maximum signal
intensity.

5. The electronic warfare apparatus of claim 4, wherein:
the first variable attenuator is configured to attenuate the
signal intensity of the first amplification signal to a
signal intensity greater than a signal intensity of a
reflection signal received from the radar and less than
a signal intensity of the deception signal and output the
first attenuation signal.

6. The electronic warfare apparatus of claim 3, wherein:
the deception signal processing unit includes
a second amplifier configured to amplify the deception
signal and output a second amplification signal; and
a second variable attenuator configured to attenuate a
signal intensity of the second amplification signal and
output a second attenuation signal.

7. The electronic warfare apparatus of claim 6, wherein:
the second amplifier is configured to amplify the decep-
tion signal to the maximum and output the second
amplification signal of a constant maximum signal
intensity.

8. The electronic warfare apparatus of claim 7, wherein:
the second variable attenuator is configured to attenuate a
signal intensity of the second attenuation signal to a
signal intensity greater than a signal intensity of the
first attenuation signal and output the second attenua-
tion signal.

9. The electronic warfare apparatus of claim 6, wherein:
the combiner is configured to combine the first attenuation
signal and the second attenuation signal and output the
noise mixture deception signal.

10. An electronic warfare apparatus comprising:
a Doppler generator configured to change an input fre-
quency of a transmission signal of a radar and output a
first deception signal having a deception frequency;
a noise processing unit configured to mix noise with the
first deception signal having the deception frequency
and then control a signal intensity of the noise to a
signal intensity capable of masking a reflection signal
received from a radar, and output a noise signal;
a deception signal processing unit configured to control a
signal intensity of the first deception signal to a signal
intensity greater than a signal intensity of the noise
signal and output a second deception signal; and
a combiner configured to combine the noise signal and the
second deception signal and output a noise mixture
deception signal, the Doppler generator includes
a phase control waveform generator configured to per-
form a phase change at a phase control interval from a
phase of 0 [deg] to 360 [deg] on the input frequency for
a time corresponding to a reciprocal of the phase
control frequency and generate the phase control fre-
quency; and
a digital phase shifter configured to add the phase control
frequency to the input frequency and generate the
deception frequency.

11. The electronic warfare apparatus of claim 10, further
comprising:
a distributor configured to distribute the first deception
signal having the deception frequency to the noise
processing unit and the deception signal processing
unit.

12. A noise addition method for a deception frequency, the
noise addition method comprising:
changing an input frequency of a transmission signal of a
radar and outputting a deception signal having the
deception frequency;
distributing the deception signal to a first path and a
second path;
mixing noise with the deception signal in the first path and
then controlling a signal intensity of the noise, and
outputting a noise signal;
controlling a signal intensity of the deception signal in the
second path and outputting the deception signal; and
combining a noise signal output in the first path and the
deception signal output in the second path and output-
ting a noise mixture deception signal,
the outputting of the deception signal includes
performing a phase change at a phase control interval
from a phase of 0 [deg] to 360 [deg] on the input
frequency for a time corresponding to a reciprocal of
the phase control frequency and generating the phase
control frequency; and
adding the phase control frequency to the input frequency
and generating the deception frequency.

13. The noise addition method of claim 12, wherein:
the signal intensity of the noise is controlled so that the
noise signal may mask a reflection signal obtained by
reflecting the transmission signal from a target.

14. The noise addition method of claim 12, wherein:
the outputting of the noise signal includes
mixing the noise with the deception signal and outputting
a first noise addition signal;
amplifying the first noise addition signal to the maximum
and outputting the first amplification signal of a con-
stant maximum signal intensity; and
attenuating the signal intensity of the first amplification
signal to a signal intensity greater than a signal inten-
sity of a reflection signal received from the radar and
less than a signal intensity of the deception signal and
outputting the first attenuation signal.

15. The noise addition method of claim 14, wherein:
the controlling of the signal intensity of the deception
signal in the second path and outputting of the decep-
tion signal includes
amplifying the deception signal to the maximum and
outputting the second amplification signal of a constant
maximum signal intensity; and
attenuating a signal intensity of the second attenuation
signal to a signal intensity greater than a signal inten-
sity of the first attenuation signal and outputting the
second attenuation signal.

16. The noise addition method of claim 15, wherein:

the noise mixture deception signal is output by combining the first attenuation signal and the second attenuation signal.

17. A noise addition method for a deception frequency, the noise addition method comprising:

changing an input frequency of a transmission signal of a radar and outputting a first deception signal having the deception frequency;

mixing noise with the first deception signal having the deception frequency and then control a signal intensity of the noise to a signal intensity capable of masking a reflection signal received from a radar, and outputting a noise signal;

controlling a signal intensity of the first deception signal to a signal intensity greater than a signal intensity of the noise signal and outputting a second deception signal; and combining the noise signal and the second deception signal and outputting a noise mixture deception signal, the outputting of the first deception signal includes performing a phase change at a phase control interval from a phase of 0 [deg] to 360 [deg] on the input frequency for a time corresponding to a reciprocal of the phase control frequency and generating the phase control frequency; and adding the phase control frequency to the input frequency and generating the deception frequency.

18. The noise addition method of claim 17, wherein:

the outputting of the noise signal includes mixing noise with the first deception signal and outputting a first noise addition signal;

amplifying the first noise addition signal to the maximum and outputting the first amplification signal of a constant maximum signal intensity; and attenuating the signal intensity of the first amplification signal to a signal intensity greater than a signal intensity of the reflection signal and less than a signal intensity of the first deception signal and outputting the noise signal.

\* \* \* \* \*